US012166532B2

(12) United States Patent
Fujiwara et al.

(10) Patent No.: US 12,166,532 B2
(45) Date of Patent: Dec. 10, 2024

(54) OPTICAL RECEIVER AND OPTICAL RECEIVING METHOD

(71) Applicant: NIPPON TELEGRAPH AND TELEPHONE CORPORATION, Tokyo (JP)

(72) Inventors: Masamichi Fujiwara, Musashino (JP); Junichi Kani, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 86 days.

(21) Appl. No.: 17/928,476

(22) PCT Filed: Jun. 5, 2020

(86) PCT No.: PCT/JP2020/022360
§ 371 (c)(1),
(2) Date: Nov. 29, 2022

(87) PCT Pub. No.: WO2021/245921
PCT Pub. Date: Dec. 9, 2021

(65) Prior Publication Data
US 2023/0208530 A1 Jun. 29, 2023

(51) Int. Cl.
H04B 10/00 (2013.01)
H04B 10/64 (2013.01)
H04J 14/00 (2006.01)

(52) U.S. Cl.
CPC .................................. *H04B 10/64* (2013.01)

(58) Field of Classification Search
CPC .... H04B 10/61; H04B 10/612; H04B 10/613; H04B 10/614; H04B 10/616; H04B 10/64;
(Continued)

(56) References Cited

U.S. PATENT DOCUMENTS

2015/0086204 A1* 3/2015 Kaneda ................. H04B 10/64
398/76

FOREIGN PATENT DOCUMENTS

JP 2010-028470 A 2/2010
WO WO-2015042011 A1 3/2015

OTHER PUBLICATIONS

Junwen Zhang et al., "Rate-flexible Single-wavelength TFDM 100G Coherent PON based on Digital Subcarrier Multiplexing Technology", OFC2020, WIE.5, 2020.
(Continued)

*Primary Examiner* — Daniel G Dobson

(57) ABSTRACT

Provided is an optical receiver including: a heterodyne detection unit that converts, by heterodyne detection, a subcarrier multiplexed signal in which a plurality of optical signals transmitted from a plurality of optical transmitters are multiplexed, into an electrical signal in an intermediate frequency band; a filter unit that removes a carrier component from the electrical signal in the intermediate frequency band, generated by the conversion, to extract a subcarrier component; an analog-digital conversion unit that performs analog-digital conversion on a signal having the subcarrier component, extracted by the filter unit; and a digital signal processing unit that performs digital signal processing for each subcarrier on a digital signal generated by the analog-digital conversion performed by the analog-digital conversion unit.

8 Claims, 13 Drawing Sheets

(58) Field of Classification Search
CPC .............. H04J 14/0241; H04J 14/0242; H04J 14/0249; H04J 14/025
See application file for complete search history.

(56) References Cited

OTHER PUBLICATIONS

Christoph Kottke et al., "Coherent SCM-WDM-PON System using OFDM or Single Carrier with SSB Modulation and Wavelength Reuse", 39th European Conference and Exhibition on Optical Communication (ECOC 2013) [online], Oct. 28, 2013 [retrieved on Nov. 6, 2020, Retrieved from the Internet: <URL: https://ieeexplore.ieee.org/document/6647656>, <DOI:10.1049/cp.2013.1463>, ISBN 978-1-84919-759-5.

Terumi Chikama et al: "Modulation and Demodulation Techniques in Optical Heterodyne PSK Transmission Systems", Journal of Lightwave Technology, IEEE, USA, vol. 8, No. 3, Mar. 1, 1990 (Mar. 1, 1990), pp. 309-322, XP000136397, ISSN: 0733-8724, DOI: 10.1109/50.50728.

\* cited by examiner

OPTICAL RECEIVER AND OPTICAL RECEIVING METHOD

CROSS-REFERENCE TO RELATED APPLICATIONS

This application is a 371 U.S. National Phase of International Application No. PCT/JP2020/022360, filed on Jun. 5, 2020. The entire disclosure of the above application is incorporated herein by reference.

TECHNICAL FIELD

The present invention relates optical receiver and optical receiving method.

BACKGROUND ART

Conventional transmission of optical subcarrier multiplexed signals uses carrier suppressed optical subcarrier multiplexed signals generated by using optical IQ modulators for optical transmitters. In this case, the optical receiver uses optical intradyne detection to demodulate the optical subcarrier multiplexed signal. This reduces effects of deterioration of signal quality caused by interference noise in optical intradyne detection.

FIG. 16 is a block diagram illustrating the functional configuration of a conventional optical transmitter 100. The optical transmitter 100 is a transmitter for generating a carrier suppressed optical subcarrier multiplexed signal. The optical transmitter 100 includes a serial-parallel converter 101, symbol mappers 102-1 to 102-$n$ ($n$ is an integer of 2 or more), frequency shifters 103-1 to 103-$n$, an adder 104, digital-to-analog (D/A) converters 105-1 and 105-2, a laser 106, and an optical IQ modulator 107.

The serial-parallel converter 101 parallelizes a data signal inputted from the outside into 2N rows. For example, the serial-parallel converter 101 parallelizes the data signal into as many rows as the number of symbol mappers 102-1 to 102-$n$. N is an integer of 1 or more.

The symbol mappers 102-1 to 102-$n$ map the parallelize data signals according to the modulation method. The mapped data signals are inputted to the frequency shifters 103-1 to 103-$n$.

The frequency shifters 103-1 to 103-$n$ shift the inputted data signals such that they do not overlap on the frequency axis.

The adder 104 adds together the data signals outputted from the frequency shifters 103-1 to 103-$n$ to generate a frequency multiplexed signal.

The D/A converters 105-1 and 105-2 perform digital-analog conversion on the frequency multiplexed signal. For example, the D/A converter 105-1 performs digital-analog conversion on the real part (I components) of the frequency multiplexed signal. For example, the D/A converter 105-2 performs digital-analog conversion on the imaginary part (Q components) of the frequency multiplexed signal. With this process, subcarrier multiplexed signals, one with the I components and the other with the Q components, are generated in the electrical step.

The laser 106 outputs an optical signal at a frequency of $f_0$ to the optical IQ modulator 107.

The optical IQ modulator 107 optically modulates the output light of the laser 106 with the subcarrier multiplexed signals, one with the I components and the other with the Q components, to generate a modulated signal. The optical IQ modulator 107 transmits the generated modulated signal via optical fiber to an optical receiver.

The parallel data in the 2N rows is, for example, as illustrated in FIG. 16, superimposed on the optical subcarriers at the frequency positions numbered with #1, ..., #N−1, #N, #N+1, #N+2, ..., and #2N. However, the optical transmitter 100 does not use all the optical subcarriers as illustrated in graph (A) in FIG. 16. The serial-parallel conversion is performed according to the optical subcarrier to be used. For example, graph (B) in FIG. 16 illustrates an example in which only the optical subcarrier #N−1 is used.

FIG. 17 is a block diagram illustrating the functional configuration of a conventional optical receiver 200. The optical receiver 200 has the configuration of a digital coherent receiver that performs general optical intradyne detection. The optical receiver 200 includes a polarization beam splitter (PBS) 201, a local oscillation light source 202, a PBS 203, optical 90-degree hybrid detectors 204-1 and 204-2, analog-to-digital (A/D) converters 205-1 and 205-2, A/D converters 206-1 and 206-2, and a digital signal processing unit 207.

The PBS 201 is a polarization splitter. The PBS 201 receives input of a modulated signal transmitted from optical transmitters 100. The PBS 201 splits the inputted modulated signal into a horizontally-polarized optical signal and a vertically-polarized optical signal. The PBS 201 outputs the horizontally-polarized optical signal to the optical 90-degree hybrid detector 204-1 and the vertically-polarized optical signal to the optical 90-degree hybrid detector 204-2.

The local oscillation light source 202 outputs local oscillation light.

The PBS 203 is a polarization splitter. The PBS 203 receives input of the local oscillation light outputted from the local oscillation light source 202. The PBS 203 splits the inputted local oscillation light into a horizontally-polarized optical signal and a vertically-polarized optical signal. The PBS 203 outputs the horizontally-polarized optical signal to the optical 90-degree hybrid detector 204-1 and the vertically-polarized optical signal to the optical 90-degree hybrid detector 204-2.

The optical 90-degree hybrid detector 204-1 receives input of the horizontally-polarized optical signals and processes them. The optical 90-degree hybrid detector 204-1 includes splitters 208-1 and 208-2, a π/2 delay unit 209, couplers 210-1 and 210-2, and balanced receivers 211-1 and 211-2.

The splitter 208-1 receives input of the horizontally-polarized optical signal outputted from the PBS 201. The splitter 208-1 splits the inputted horizontally-polarized optical signal into two signals and outputs them to the couplers 210-1 and 210-2. The splitter 208-2 receives input of the horizontally-polarized optical signal outputted from the PBS 203. The splitter 208-2 splits the inputted horizontally-polarized optical signal into two signals and outputs them to the coupler 210-1 and the π/2 delay unit 209.

The π/2 delay unit 209 delays the horizontally-polarized optical signal outputted by the splitter 208-2 by π/2 and outputs the delayed signal to the coupler 210-2.

The coupler 210-1 combines the horizontally-polarized optical signal outputted by the splitter 208-1 and the horizontally-polarized optical signal outputted by the splitter 208-2 and makes them interfere with each other to generate interference light. The coupler 210-1 splits the generated interference light into two interference light signals and outputs them to the balanced receiver 211-1.

The coupler 210-2 combines the horizontally-polarized optical signal outputted by the splitter 208-1 and the horizontally-polarized optical signal delayed by $\pi/2$, outputted by the $\pi/2$ delay unit 209 and makes them interfere with each other to generate interference light. The coupler 210-2 splits the generated interference light into two interference light signals and outputs them to the balanced receiver 211-2.

The balanced receiver 211-1 converts the two interference light signals outputted by the coupler 210-1 into electrical signals. The balanced receiver 211-1 detects the difference between the electrical signals generated by the conversion as in-phase components, in other words, I components and outputs the detected signal to the A/D converter 205-1.

The balanced receiver 211-2 converts the two interference light signals outputted by the coupler 210-2 into electrical signals. The balanced receiver 211-2 detects the difference between the electrical signals generated by the conversion as quadrature components, in other words, Q components and outputs the detected signal to the A/D converter 205-2.

The A/D converter 205-1 samples the analog electrical signal of the I components and outputs the digitally sampled signal to the digital signal processing unit 207.

The A/D converter 205-2 samples the analog electrical signal of the Q components and outputs the digitally sampled signal to the digital signal processing unit 207.

The optical 90-degree hybrid detector 204-2 receives input of the vertically-polarized optical signals and processes them. The optical 90-degree hybrid detector 204-2 includes splitters 212-1 and 212-2, a $\pi/2$ delay unit 213, couplers 214-1 and 214-2, and balanced receivers 215-1 and 215-2.

The splitter 212-1 receives input of the vertically-polarized optical signal outputted from the PBS 201. The splitter 212-1 splits the inputted vertically-polarized optical signal into two signals and outputs them to the couplers 214-1 and 214-2. The splitter 212-2 receives input of the vertically-polarized optical signal outputted from the PBS 203. The splitter 212-2 splits the inputted vertically-polarized optical signal into two signals and outputs them to the coupler 214-1 and the $\pi/2$ delay unit 213.

The $\pi/2$ delay unit 213 delays the vertically-polarized optical signal outputted by the splitter 212-2 by $\pi/2$ and outputs the delayed signal to the coupler 214-2.

The coupler 214-1 combines the vertically-polarized optical signal outputted by the splitter 212-1 and the vertically-polarized optical signal outputted by the splitter 212-2 and makes them interfere with each other to generate interference light. The coupler 214-1 splits the generated interference light into two interference light signals and outputs them to the balanced receiver 215-1.

The coupler 214-2 combines the vertically-polarized optical signal outputted by the splitter 212-1 and the vertically-polarized optical signal delayed by $\pi/2$, outputted by the $\pi/2$ delay unit 213 and makes them interfere with each other to generate interference light. The coupler 214-2 splits the generated interference light into two interference light signals and outputs them to the balanced receiver 215-2.

The balanced receiver 215-1 converts the two interference light signals outputted by the coupler 214-1 into electrical signals. The balanced receiver 215-1 detects the difference between the electrical signals generated by the conversion as in-phase components, in other words, I components and outputs the detected signal to the A/D converter 206-1.

The balanced receiver 215-2 converts the two interference light signals outputted by the coupler 214-2 into electrical signals. The balanced receiver 215-2 detects the difference between the electrical signals generated by the conversion as quadrature components, in other words, Q components and outputs the detected signal to the A/D converter 206-2.

The A/D converter 206-1 samples the analog electrical signal of the I components and outputs the digitally sampled signal to the digital signal processing unit 207.

The A/D converter 206-2 samples the analog electrical signal of the Q components and outputs the digitally sampled signal to the digital signal processing unit 207.

The digital signal processing unit 207 receives input of the digitally sampled signals outputted from the A/D converters 205-1 to 205-4. The digital signal processing unit 207 demodulates the inputted sampled signals.

The processes performed by the optical receiver 200 are the same as or similar to those performed by a general intradyne receiver used for digital coherent transmission.

In conventional techniques, as described above, optical IQ modulators are used to perform optical subcarrier modulation in transmission of optical subcarrier multiplexed signals. Thus, it is possible to suppress the carrier wave as illustrated in FIG. 16 and reduce the effects of interference noises in optical reception (See Non-Patent Literature 1).

CITATION LIST

Non-Patent Literature

Non-Patent Literature 1: Junwen Zhang, Zhensheng Jia, Haipeng Zhang, Mu Xu, Jingjie Zhu, and Luis Alberto Campos, "Rate-flexible Single-wavelength TDFM 100G Coherent PON based on Digital Subcarrier Multiplexing Technology", OFC2020, W1E.5, 2020.

SUMMARY OF THE INVENTION

Technical Problem

However, there has been a problem that an optical intradyne detector used in conventional techniques has a complicated configuration and is too expensive to be used for access systems.

In light of the above situation, an object of the present invention is to provide a technique to make it possible to perform, at low cost, deterioration of signal quality caused due to interference noise when optical reception is performed by coherent detection.

Means for Solving the Problem

An aspect of the present invention is an optical receiver including: a heterodyne detection unit that converts, by heterodyne detection, a subcarrier multiplexed signal in which a plurality of optical signals transmitted from a plurality of optical transmitters are multiplexed, into an electrical signal in an intermediate frequency band; a filter unit that removes a carrier component from the electrical signal in the intermediate frequency band, generated by the conversion, to extract a subcarrier component; an analog-digital conversion unit that performs analog-digital conversion on a signal having the subcarrier component, extracted by the filter unit; and a digital signal processing unit that performs digital signal processing for each subcarrier on a digital signal generated by the analog-digital conversion performed by the analog-digital conversion unit.

An aspect of the present invention is an optical reception method including: converting, by heterodyne detection, a subcarrier multiplexed signal in which a plurality of optical signals transmitted from a plurality of optical transmitters are multiplexed, into an electrical signal in an intermediate frequency band; removing a carrier component from the electrical signal in the intermediate frequency band, generated by the conversion, to extract a subcarrier component; performing analog-digital conversion on an extracted signal having the subcarrier component; and performing digital signal processing for each subcarrier on a digital signal generated by the analog-digital conversion.

Effects of the Invention

With the present invention, it is possible to perform, at low cost, deterioration of signal quality caused due to interference noise when optical reception is performed by coherent detection.

DESCRIPTION OF EMBODIMENTS

Hereinafter, an embodiment of the present invention will be described with reference to the drawings.

First, outline of the present invention will be described.

In an optical transmission system of the present invention including a plurality of optical network units (hereinafter referred to as "ONUs") each having an optical transmitter and one optical line terminal (hereinafter referred to as an "OLT") including an optical receiver, the optical transmitter employs an optical intensity modulator, and the optical receiver employs a heterodyne detector. Each ONU modulates a subcarrier with an optical intensity modulator and transmits the modulated signal to the OLT. The modulated signals transmitted from the ONUs are multiplexed at an optical splitter, and the multiplexed signal is inputted to the OLT. The OLT detects the subcarrier multiplexed signal by optical heterodyne detection. Next, the optical receiver removes the carrier components converted in an intermediate frequency band by using a bandpass filter in the electrical step. Then, the optical receiver extracts the subcarriers on which transmission data is superimposed.

The following describes a specific configuration.

First Embodiment

Figure 1:
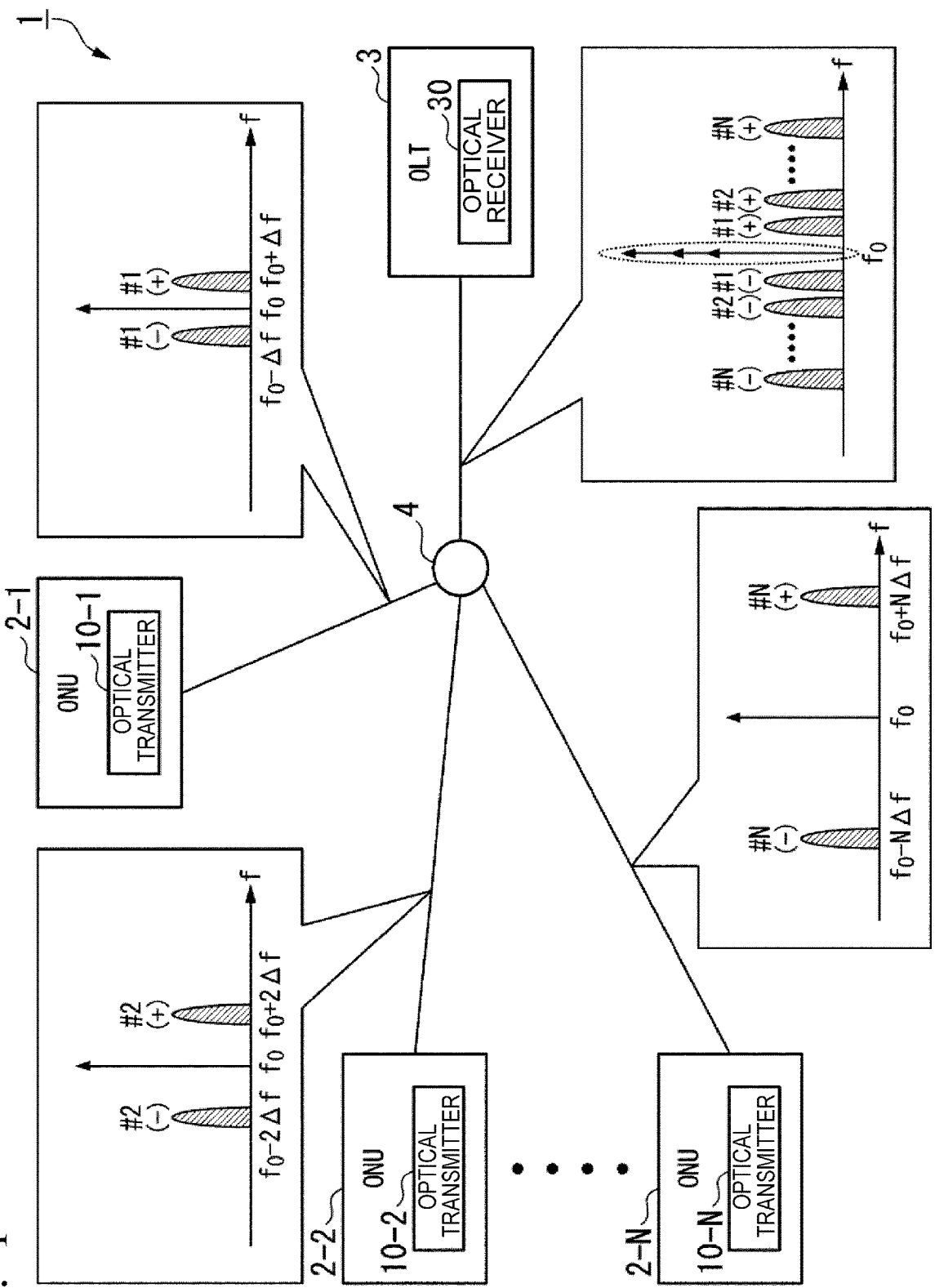
FIG. 1 is a diagram illustrating the system configuration of an optical transmission system in a first embodiment.

FIG. 1 is a diagram illustrating the system configuration of an optical transmission system 1 in a first embodiment. The following description is based on an example of a case in which the optical transmission system 1 is applied to a passive optical network (PON) system. The optical transmission system 1 includes N ONUs 2-1 to 2-N and one OLT 3. The ONUs 2-1 to 2-N and the OLT 3 are connected with optical fiber via an optical splitter 4.

The optical splitter 4 multiplexes optical signals outputted from the ONUs 2-1 to 2-N and outputs the multiplexed signal to the OLT 3. The optical splitter 4 splits an optical signal outputted from the OLT 3 and outputs the resultant signals to the ONUs 2-1 to 2-N.

The following description focuses on the uplink signal transmission from the ONUs 2-1 to 2-N to the OLT 3. In the following description, when each of the ONUs 2-1 to 2-N is not particularly distinguished, those are expressed as an ONU 2.

The ONU 2 is, for example, provided inside the house of a subscriber who receives communication service. The ONU 2 includes an optical transmitter 10. The optical transmitter 10 transmits optical signals.

The OLT 3 is, for example, provided at a local exchange. The OLT 3 includes an optical receiver 30. The optical receiver 30 receives a subcarrier multiplexed signal which is generated by multiplexing by the optical splitter 4.

Each of the optical transmitters 10-1 to 2-N of the ONUs 2-1 to 2-N generates a modulated signal by optically modulating a laser output at the same frequency ($f_0$) with a subcarrier in the electrical step on which transmission data is superimposed. The modulated signals generated by the ONUs 2 are merged together at the optical splitter 4 and optically-subcarrier-multiplexed, and the multiplexed signal is transmitted to the OLT 3.

FIG. 1 show a case in which the ONUs 2-1 to 2-N generate optical subcarriers at positions of $f_0 \pm \Delta f$, $f_0 \pm 2\Delta f$, ... and $f_0 \pm N\Delta f$, respectively. For example, the ONU 2-1 generates optical subcarriers at positions of $f_0 \pm \Delta f$, the ONU 2-2 generates optical subcarriers at positions of $f_0 + 2\Delta f$, and the ONU 2-N generates optical subcarriers at positions of $f_0 \pm N\Delta f$. In other words, it shows a case in which one ONU 2 generates one optical subcarrier, but one ONU 2 may generate a plurality of optical subcarriers.

In the case in which the ONUs 2-1 to 2-N transmit modulated signals of optical subcarriers shown in FIG. 1, the subcarrier multiplexed signal that the OLT 3 receives has the carrier waves superimposed at the same frequency ($f_0$).

Figure 2:
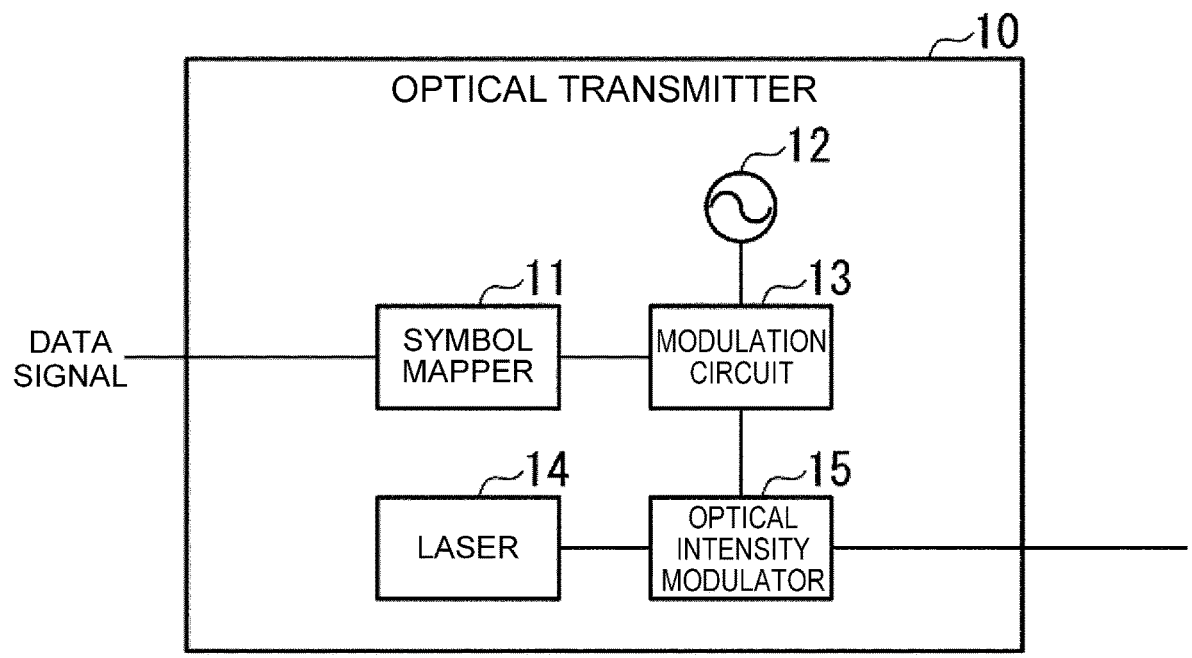
FIG. 2 is a block diagram illustrating the functional configuration of an optical transmitter in the first embodiment.

FIG. 2 is a block diagram illustrating the functional configuration of the optical transmitter 10 in the first embodiment. The optical transmitter 10 includes a symbol mapper 11, an oscillator 12, a modulation circuit 13, a laser 14, and an optical intensity modulator 15. FIG. 2 illustrates the configuration of an optical transmitter in an analog method.

The symbol mapper 11 maps a data signal inputted from the outside according to the modulation method.

The oscillator 12 outputs a sine wave (subcarrier) at a frequency of $k\Delta f$ (k=1, 2, . . . , and N).

The modulation circuit 13 modulates the subcarrier outputted from the oscillator 12 with the data mapped by the symbol mapper 11.

The laser 14 outputs an optical signal at a frequency of $f_0$ to the optical intensity modulator 15.

The optical intensity modulator 15 optically modulates the output light of the laser 14 with the subcarrier modulated by the modulation circuit 13. Specifically, the optical intensity modulator 15 generates a modulated signal by optically modulating the intensity of the output light of the laser 14 with the subcarrier modulated by the modulation circuit 13.

Figure 3:
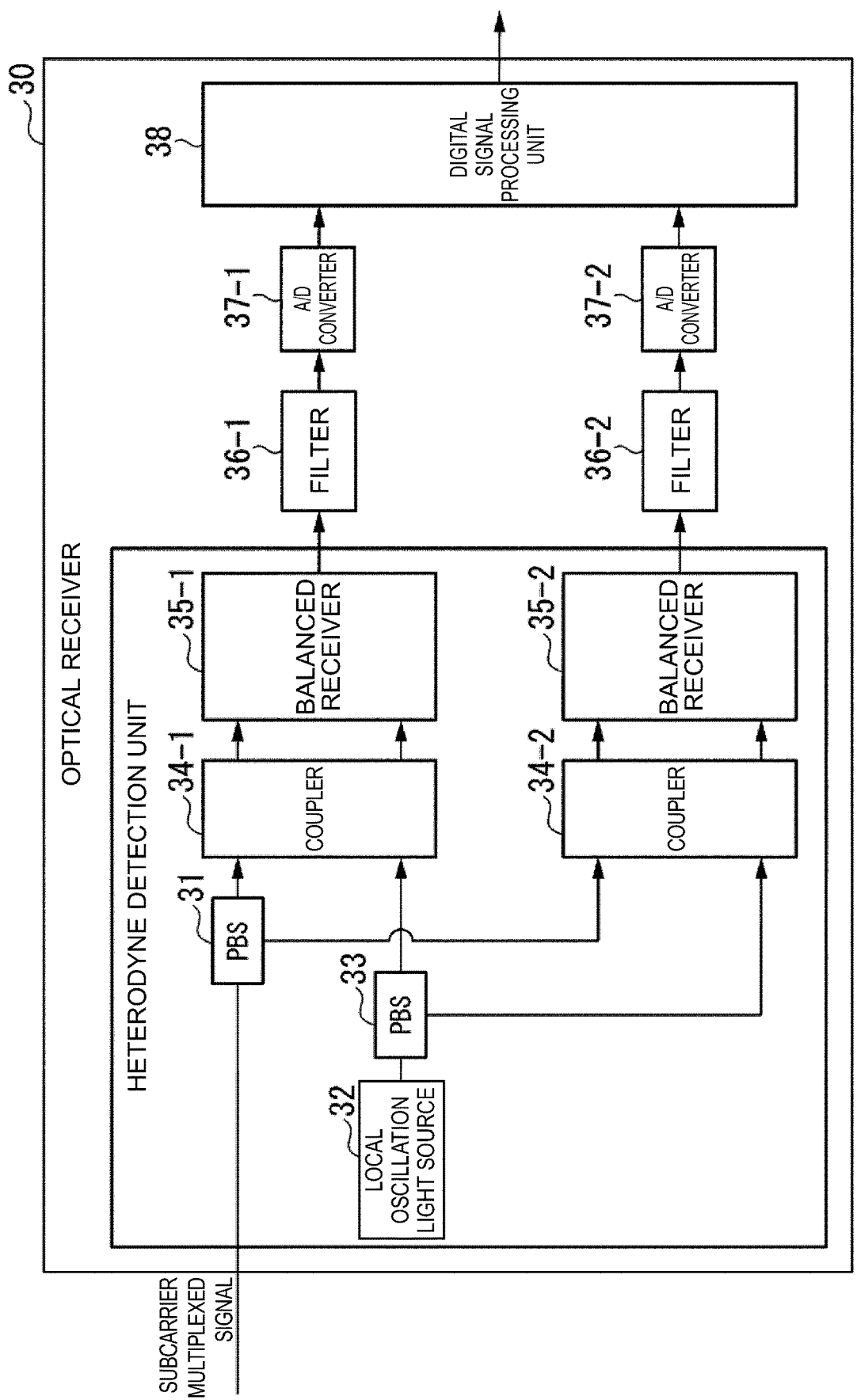
FIG. 3 is a block diagram illustrating the functional configuration of an optical receiver in the first embodiment.

FIG. 3 is a block diagram illustrating the functional configuration of the optical receiver 30 in the first embodiment. The optical receiver 30 is a digital coherent receiver that performs optical heterodyne detection. The optical receiver 30 includes a PBS 31, a local oscillation light source 32, a PBS 33, couplers 34-1 and 34-2, balanced receivers 35-1 and 35-2, filters 36-1 and 36-2, A/D converters 37-1 and 37-2, and a digital signal processing unit 38 (digital signal processor). The PBS 31, the local oscillation light source 32, the PBS 33, the couplers 34-1 and 34-2, and the balanced receivers 35-1 and 35-2 show an example of a heterodyne detection unit (heterodyne detector).

The PBS 31 is a polarization splitter. The PBS 31 receives input of the subcarrier multiplexed signal which is generated by multiplexing by the optical splitter 4. The PBS 31 splits the inputted subcarrier multiplexed signal into a horizontally-polarized subcarrier multiplexed signal and a vertically-polarized subcarrier multiplexed signal. The PBS 31 outputs the horizontally-polarized subcarrier multiplexed signal to the coupler 34-1 and outputs the vertically-polarized subcarrier multiplexed signal to the coupler 34-2.

The local oscillation light source 32 outputs local oscillation light used for optical heterodyne detection.

The PBS 33 is a polarization splitter. The PBS 33 receives input of the local oscillation light outputted from the local oscillation light source 32. The PBS 33 splits the inputted local oscillation light into a horizontally-polarized optical signal and a vertically-polarized optical signal. The PBS 33 outputs the horizontally-polarized optical signal to the coupler 34-1 and outputs the vertically-polarized optical signal to the coupler 34-2.

The coupler 34-1 combines the horizontally-polarized subcarrier multiplexed signal outputted by the PBS 31 and the horizontally-polarized optical signal outputted by the PBS 33 and makes them interfere with each other to generate interference light. The coupler 34-1 splits the generated interference light into two interference light signals and outputs them to the balanced receiver 35-1.

The coupler 34-2 combines the vertically-polarized subcarrier multiplexed signal outputted by the PBS 31 and the vertically-polarized optical signal outputted by the PBS 33 and makes them interfere with each other to generate interference light. The coupler 34-2 splits the generated interference light into two interference light signals and outputs them to the balanced receiver 35-2.

The balanced receiver 35-1 converts the two interference light signals outputted by the coupler 34-1 into electrical signals. The balanced receiver 35-1 outputs the difference between the electrical signals generated by the conversion to the filter 36-1.

The balanced receiver 35-2 converts the two interference light signals outputted by the coupler 34-2 into electrical signals. The balanced receiver 35-2 outputs the difference between the electrical signals generated by the conversion to the filter 36-2.

The filter 36-1 performs filtering on the electrical signal corresponding to the difference between the two interference light signals outputted from the balanced receiver 35-1. The filter 36-1 is a low-pass filter (LPF) or a high-pass filter (HPF). The LPF or HPF may be an analog circuit as illustrated in the figure, but it may be digital signal processing.

For example, the filter 36-1 extracts only the upper side band components (+) of the subcarrier multiplexed (SCM) signal with a LPF or only the lower side band components (−) with an HPF. Extracting the upper side band components is more economical because an A/D converter for lower frequencies can be used for reception.

The filter 36-2 performs filtering on the electrical signal corresponding to the difference between the two interference light signals outputted from the balanced receiver 35-2. The filter 36-2 is a LPF or an HPF.

The A/D converter 37-1 performs analog-digital conversion on the upper side band components (+) or the lower side band components (−) extracted by the filter 36-1 to generate a digital signal.

The A/D converter 37-2 performs analog-digital conversion on the upper side band components (+) or the lower side band components (−) extracted by the filter 36-2 to generate a digital signal.

The digital signal processing unit 38 receives input of the digital signals outputted from the A/D converters 37-1 and 37-2. The digital signal processing unit 38 demodulates the inputted digital signals by performing digital signal processing on them for each subcarrier.

Figure 4:
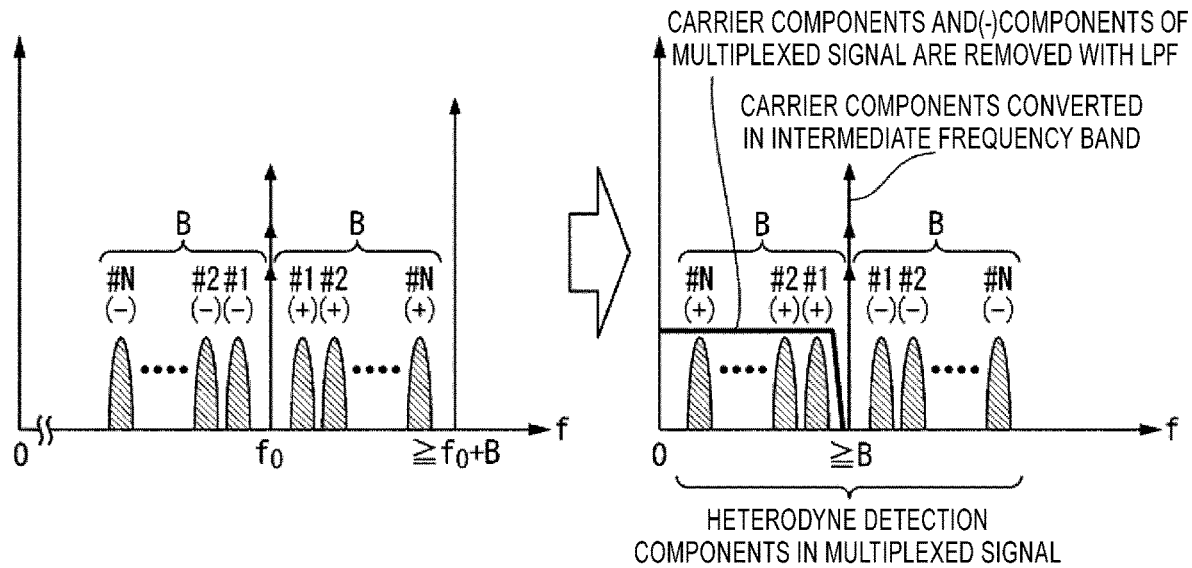
FIG. 4 is a diagram illustrating an example of a case in which the carrier wave is set at a frequency position higher than or equal to $f_0+B$ in the first embodiment.
Figure 5:
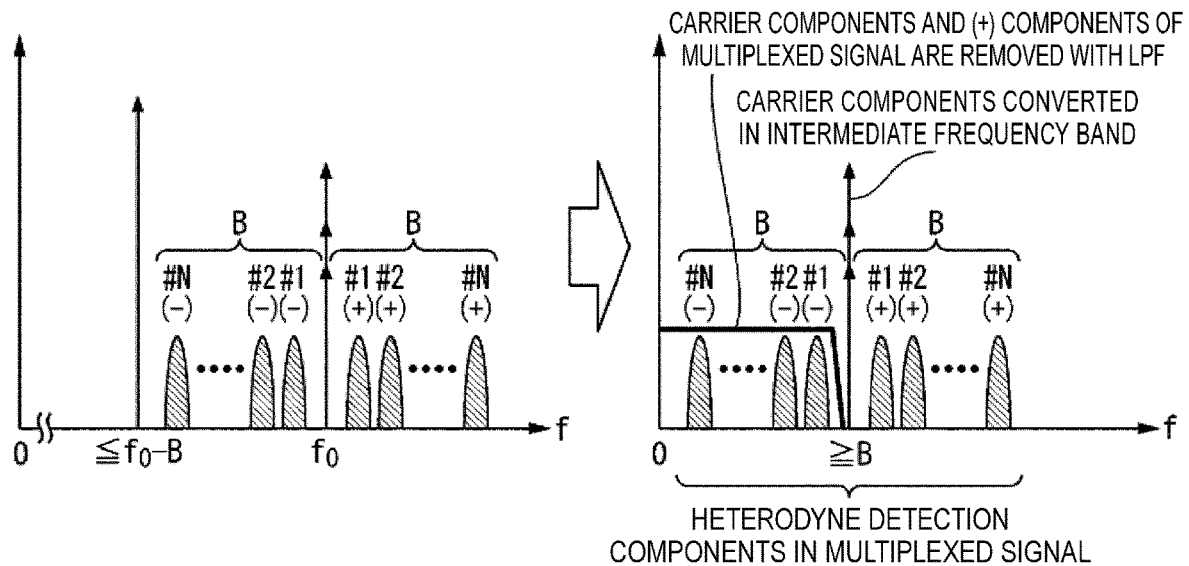
FIG. 5 is a diagram illustrating an example of a case in which the carrier wave is set at a frequency position lower than or equal to $f_0-B$ in the first embodiment.

The subcarrier modulated signal generated by the optical transmitter 10 illustrated in FIG. 2 is generated within the range of ±B with respect to the carrier wave frequency $f_0$. FIG. 4 illustrates an example of a case in which the carrier wave is set at a frequency position higher than or equal to $f_0+B$, and FIG. 5 illustrates an example of a case in which the carrier wave is set at a frequency position lower than or equal to $f_0-B$. In FIGS. 4 and 5, the left diagrams show the positions of the frequencies of the subcarrier multiplexed signal received by the optical receiver 30, and the right diagrams are for explaining concrete processes by the optical receiver 30.

The right diagram of FIG. 4 illustrates an example in which the lower side band components (−) and the carrier components of the subcarrier multiplexed signal converted into signals in an intermediate frequency band by optical heterodyne detection are removed by an LPF.

The right diagram of FIG. 5 illustrates an example in which the upper side band components (+) and the carrier components of the subcarrier multiplexed signal converted into signals in an intermediate frequency band by optical heterodyne detection are removed by an LPF.

Figure 6:
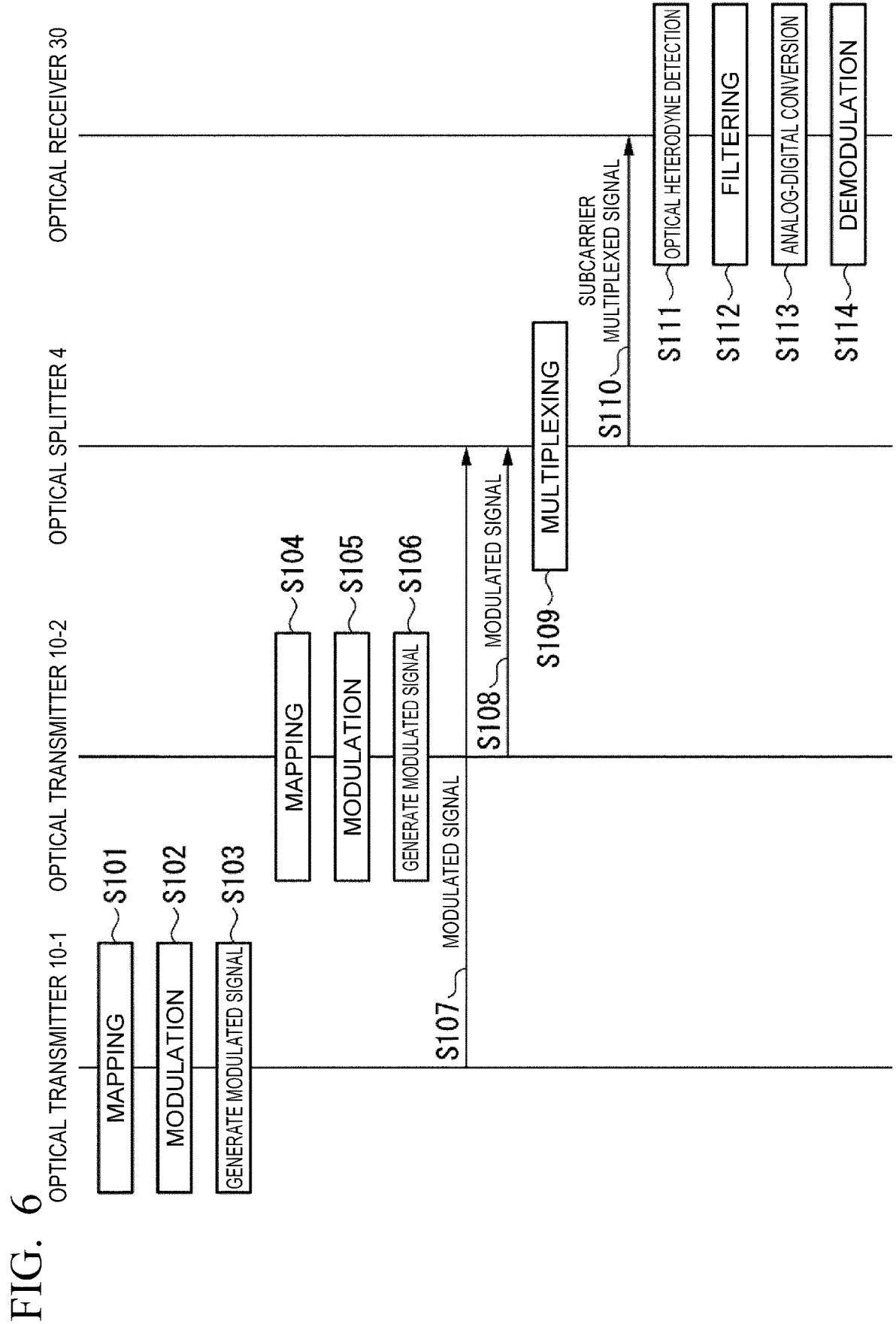
FIG. 6 is a sequence diagram showing the procedure of processes performed by the optical transmission system in the first embodiment.

FIG. 6 is a sequence diagram showing the procedure of processes performed by the optical transmission system 1 in the first embodiment. Description of the processes in FIG. 6 is based on an example of a case in which the optical transmission system 1 includes two optical transmitters 10 (optical transmitters 10-1 and 10-2). Note that in order to distinguish the functional units of the optical transmitters 10, the functional units of each optical transmitter 10 will be given sub-numbers in the following description.

The symbol mapper 11-1 of the optical transmitter 10-1 maps a data signal inputted from the outside according to the modulation method (step S101). The symbol mapper 11-1 outputs the mapped data to the modulation circuit 13-1. The modulation circuit 13-1 receives input of the subcarrier at a frequency of $\Delta f$ outputted from the oscillator 12-1 and the mapped data outputted from the symbol mapper 11-1. The modulation circuit 13-1 modulates the inputted subcarrier with the mapped data (step S102). The modulation circuit 13-1 outputs the modulated subcarrier to the optical intensity modulator 15-1.

The optical intensity modulator 15-1 receives input of an optical signal at a frequency of $f_0$ outputted from the laser 14-1 and the modulated subcarrier outputted from the modulation circuit 13-1. The optical intensity modulator 15-1 optically modulates the intensity of the inputted light outputted from the laser 14-1 with the modulated subcarrier outputted from the modulation circuit 13-1. With this operation, the optical intensity modulator 15-1 generates a modulated signal (step S103).

The symbol mapper 11-2 of the optical transmitter 10-2 maps a data signal inputted from the outside according to the modulation method (step S104). The symbol mapper 11-2 outputs the mapped data to the modulation circuit 13-2. The modulation circuit 13-2 receives input of the subcarrier at a frequency of $2\Delta f$ outputted from the oscillator 12-2 and the mapped data outputted from the symbol mapper 11-2. The modulation circuit 13-2 modulates the inputted subcarrier with the mapped data (step S105). The modulation circuit 13-2 outputs the modulated subcarrier to the optical intensity modulator 15-2.

The optical intensity modulator 15-2 receives input of an optical signal at a frequency of $f_0$ outputted from the laser 14-2 and the modulated subcarrier outputted from the modulation circuit 13-2. The optical intensity modulator 15-2 optically modulates the intensity of the inputted light outputted from the laser 14-2 with the modulated subcarrier outputted from the modulation circuit 13-2. With this operation, the optical intensity modulator 15-2 generates a modulated signal (step S106).

The optical transmitter 10-1 transmits the modulated signal generated by the optical intensity modulator 15-1 (step S107). The optical transmitter 10-2 transmits the modulated signal generated by the optical intensity modulator 15-2 (step S108).

The optical splitter 4 receives the modulated signals outputted from the optical transmitters 10-1 and 10-2. The optical splitter 4 multiplexes the received modulated signals to generate a subcarrier multiplexed signal (step S109). The optical splitter 4 transmits to the generated subcarrier multiplexed signal to the optical receiver 30 (step S110).

The optical receiver 30 receives the subcarrier multiplexed signal outputted from the optical splitter 4. The optical receiver 30 performs optical heterodyne detection on the received subcarrier multiplexed signal to obtain a horizontally-polarized electrical signal and a vertically-polarized electrical signal (step S111). The filter 36-1 performs filtering on the horizontally-polarized electrical signal. The filter 36-2 performs filtering on the vertically-polarized electrical signal (step S112).

The A/D converter 37-1 performs analog-digital conversion on the upper side band components (+) or the lower side band components (−) extracted by the filter 36-1 and generates a digital signal. The A/D converter 37-2 performs analog-digital conversion on the upper side band components (+) or the lower side band components (−) extracted by the filter 36-2 and generates a digital signal (step S113).

The digital signal processing unit 38 receives input of the digital signals outputted from the A/D converters 37-1 and 37-2. The digital signal processing unit 38 demodulates the inputted digital signals by performing digital signal processing on them for each subcarrier (step S114).

With the optical transmission system 1 in the first embodiment, configured as described above, the optical receiver 30 performs optical heterodyne detection on the subcarrier multiplexed signal based on the modulated signal transmitted from each optical transmitter 10, and the carrier components converted in an intermediate frequency band are removed by a filter in the electrical step. Then, the optical receiver 30 extracts the subcarriers on which the transmission data is superimposed from the signal from which the carrier components have been removed, and demodulates the resultant signal. With this operation, it is possible to significantly reduce signal quality deterioration caused due to interference noise when optical reception is performed by optical coherent detection. In addition, since the optical receiver 30 employs an optical heterodyne detector instead of an optical intradyne detector, it is possible to achieve cost reduction of the optical receiver. Thus, it is possible to perform, at low cost, deterioration of signal quality caused due to interference noise when optical reception is performed by coherent detection.

Second Embodiment

In the first embodiment, a description was given of a case of using optical transmitters in an analog method. In a second embodiment, a description will be given of a case of using optical transmitters having a configuration in a digital method. The configuration of the optical receiver in the second embodiment is the same as or similar to that in the first embodiment, and hence description thereof is omitted.

Figure 7:
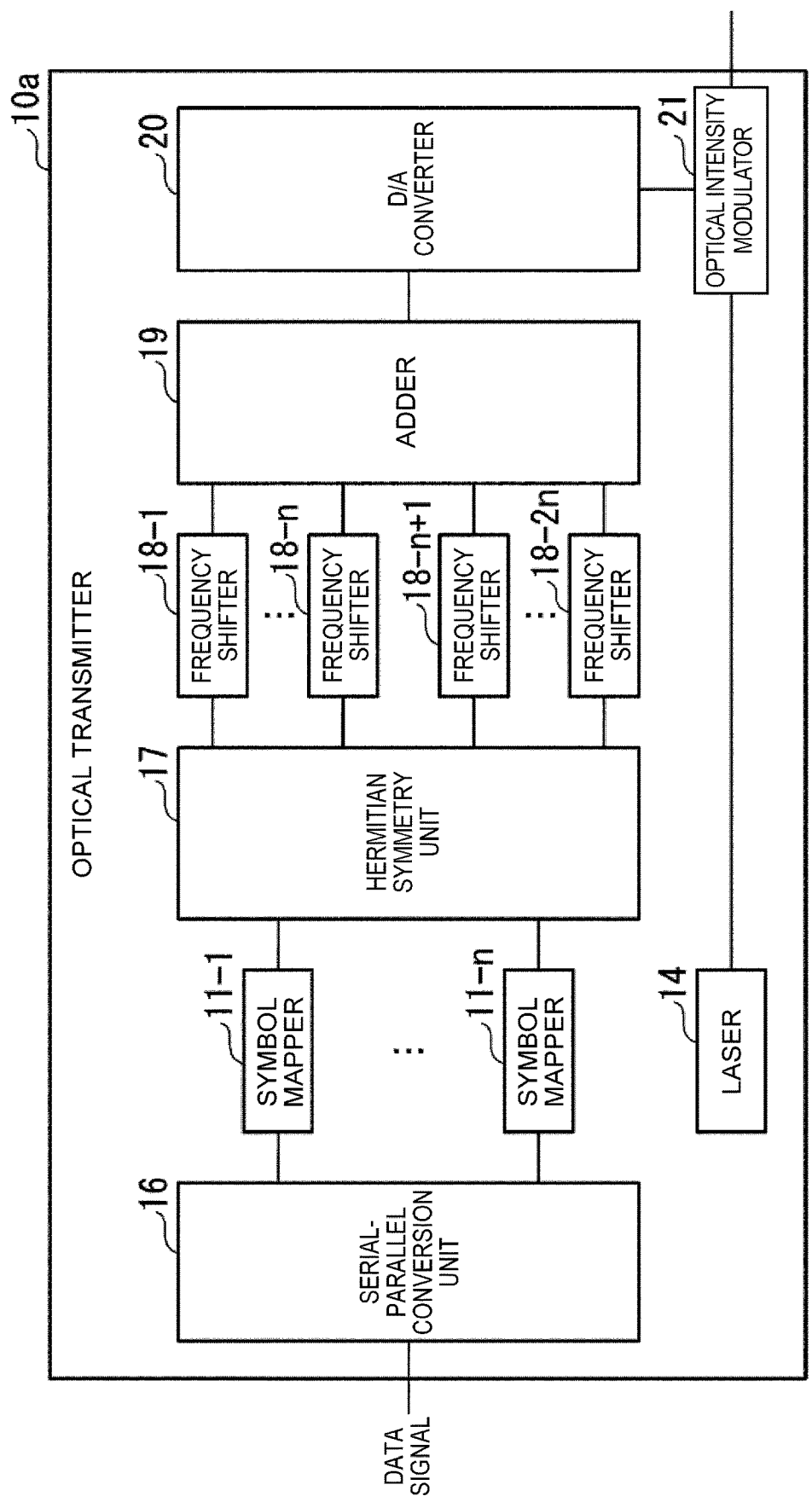
FIG. 7 is a block diagram illustrating the functional configuration of an optical transmitter in a second embodiment.

FIG. 7 is a block diagram illustrating the functional configuration of the optical transmitter 10a in the second embodiment. The optical transmitter 10a includes symbol mappers 11-1 to 11-n, a laser 14, a serial-parallel converter 16, a Hermitian symmetry unit 17, frequency shifters 18-1 to 18-2n, an adder 19, a D/A converter 20, and an optical intensity modulator 21. The number of frequency shifters 18-1 to 18-2n is twice the number of symbol mappers 11.

The serial-parallel converter 16 parallelizes a data signal inputted from the outside into 2N rows. For example, the serial-parallel converter 16 parallelizes a data signal into as many rows as the number of the symbol mappers 11-1 to 11-n.

The symbol mappers 11-1 to 11-n map the parallelized data signals according to the modulation method. The mapped data signals are inputted into the Hermitian symmetry unit 17.

The Hermitian symmetry unit 17 arranges the inputted mapped data signals on a subcarrier such that the data are complex conjugates with the zero frequency centered. With this operation, the Hermitian symmetry unit 17 can generate the real number components and imaginary number components of the parallelized data signals.

The frequency shifters 18-1 to 18-2n shift the parallel data outputted from the Hermitian symmetry unit 17 such that it does not overlap on the frequency axis. The frequency shifters 18-1 to 18-n shift the parallel data of the upper side band components such that it does not overlap on the frequency axis. The frequency shifters 18-n+1 to 2n shift the parallel data of the lower side band components such that it does not overlap on the frequency axis.

The adder 19 adds together the data signals outputted from the frequency shifters 18-1 to 18-2n to generate a frequency subcarrier multiplexed signal.

The D/A converter 20 performs digital-analog conversion on the frequency subcarrier multiplexed signal. With this operation, the D/A converter 20 generates an I subcarrier multiplexed signal in the electrical step.

The optical intensity modulator 21 optically modulates the output light of the laser 14 with the I subcarrier multiplexed signal to generate a modulated signal. The modulated signals generated by the ONUs 2 are merged at the optical splitter 4, optically-subcarrier-multiplexed, and transmitted to the OLT 3.

With the optical transmission system 1 in the second embodiment, configured as described above, use of the optical transmitter 10a in place of the optical transmitter 10 in the first embodiment, it is possible to provide effects the same as or similar to those in the first embodiment.

The optical transmission system 1 in the present invention, as described above, can also employ optical transmitters in digital methods.

Third Embodiment

Description of the first embodiment and the second embodiment is based on a case of using double-side-band (DSB) optical transmitters. In a third embodiment, a description will be given of a case of using single-side-band (SSB) optical transmitters. The configuration of an optical receiver in the third embodiment is the same as or similar to those in the first and second embodiments, and hence description thereof is omitted.

Figure 8:
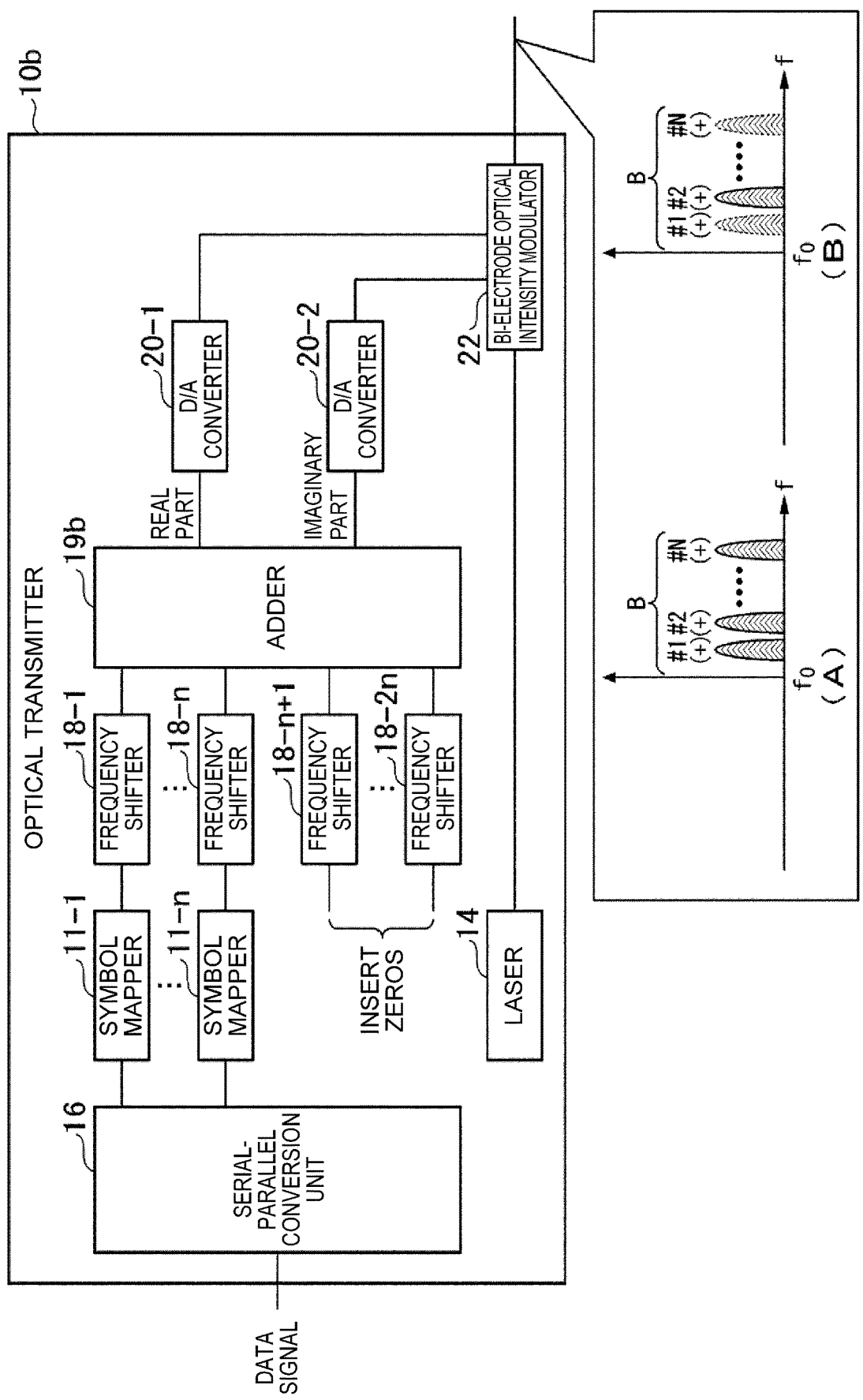
FIG. 8 is a block diagram illustrating the functional configuration of an optical transmitter in a third embodiment.

FIG. 8 is a block diagram illustrating the functional configuration of an optical transmitter 10b in the third embodiment. The optical transmitter 10b includes symbol mappers 11-1 to 11-n, a laser 14, a serial-parallel converter 16, frequency shifters 18-1 to 18-2n, an adder 19b, D/A converters 20-1 and 20-2, and a bi-electrode optical intensity modulator 22. In the following, description will be made of only differences from the optical transmitter 10a in the second embodiment.

The frequency shifters 18-1 to 18-n shift the data signals mapped by the symbol mappers 11-1 to 11-n such that data signals do not overlap on the frequency axis. The frequency shifters 18-n+1 to 18-2n receive input of values zero. In this case, the outputs from the frequency shifters 18-n+1 to 18-2n are zeros.

The adder 19b adds together the data signals outputted from the frequency shifters 18-1 to 18-2n to generate a frequency multiplexed signal. In the example of FIG. 8, the adder 19b adds together the data signals outputted from the frequency shifters 18-1 to 18-n to generate a frequency multiplexed signal.

The D/A converters 20-1 and 20-2 perform digital-analog conversion on the frequency multiplexed signal. For example, the D/A converter 20-1 performs digital-analog conversion on the real part (I components) of the frequency multiplexed signal. For example, the D/A converter 20-2 performs digital-analog conversion on the imaginary part (Q components) of the frequency multiplexed signal. Through this process, subcarrier multiplexed signals, one with the I components and the other with the Q components, are generated in the electrical step.

The bi-electrode optical intensity modulator 22 optically modulates the intensity of the output light of the laser 14 with the subcarrier multiplexed signals, one with the I components and the other with the Q components, to generate a modulated signal. The bi-electrode optical intensity modulator 22 receives input of a subcarrier multiplexed signal with either type of component, the I components or the Q components. Thus, the bi-electrode optical intensity modulator 22 generates a modulated signal with the components in either the upper side band (+) or the lower side band (−). The bi-electrode optical intensity modulator 22 transmits the generated modulated signal via optical fiber to an optical receiver.

Figure 9:
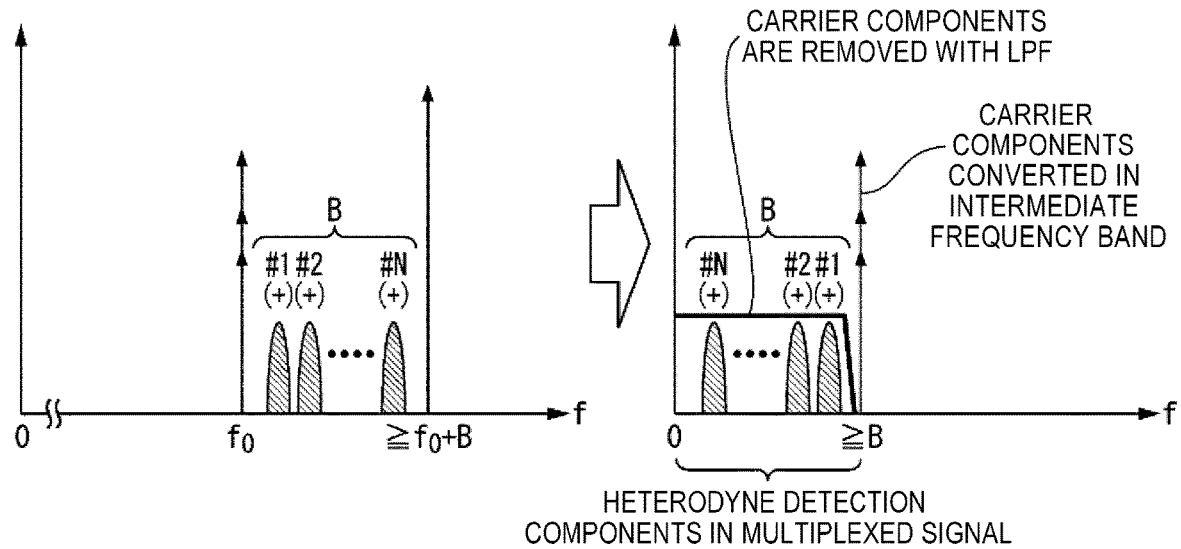
FIG. 9 is a diagram illustrating an example of a case in which the carrier wave is set at a frequency position higher than or equal to $f_0+B$ in the third embodiment.
Figure 10:
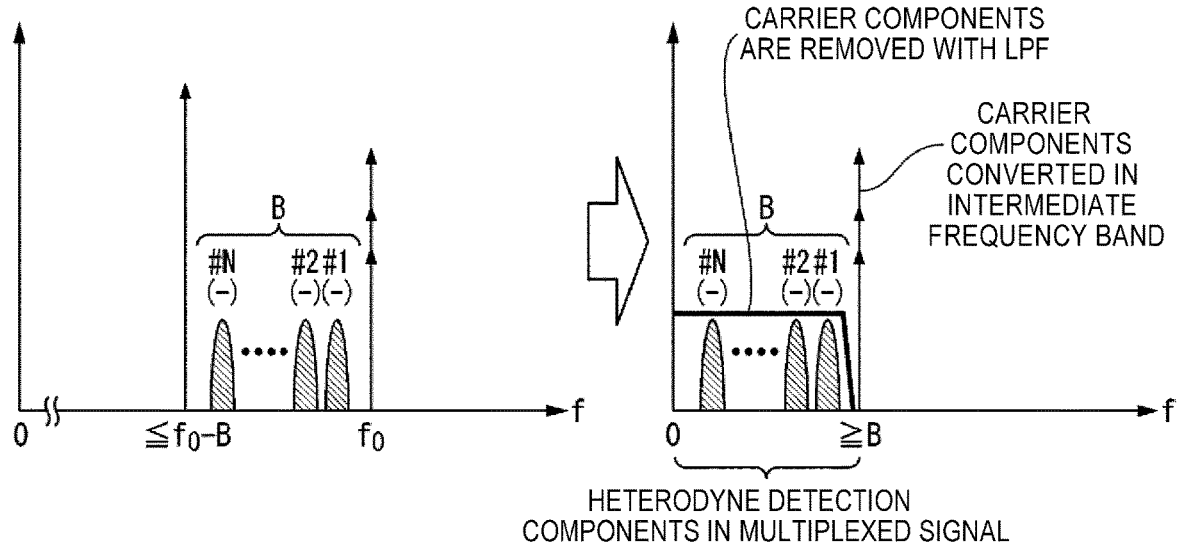
FIG. 10 is a diagram illustrating an example of a case in which the carrier wave is set at a frequency position lower than or equal to $f_0-B$ in the third embodiment.
Figure 11:
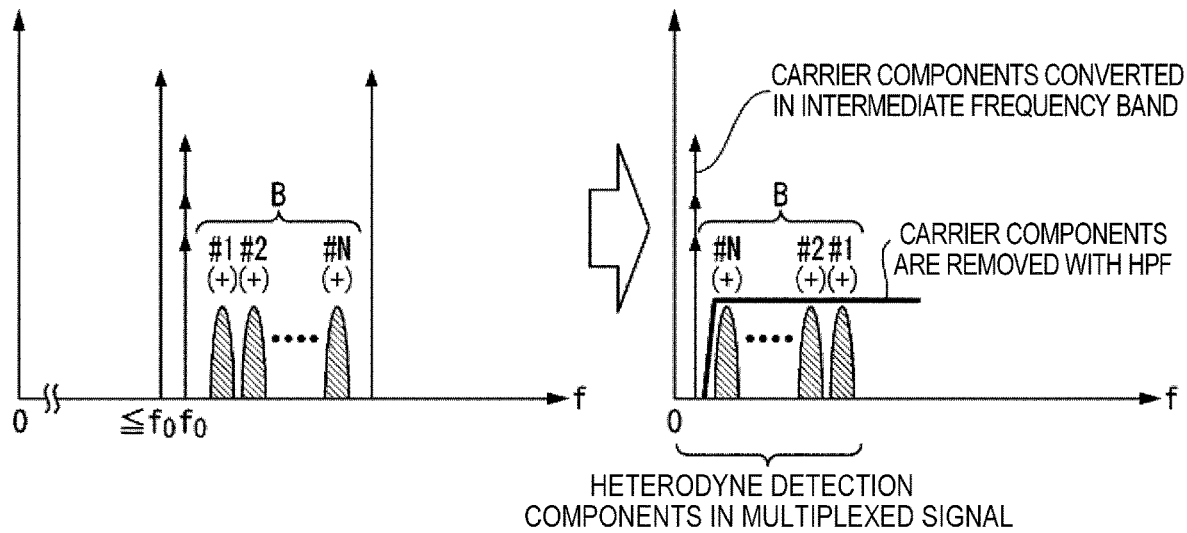
FIG. 11 is a diagram illustrating an example of a case in which the carrier wave is set at a frequency position lower than or equal to $f_0$ in the third embodiment.

The subcarrier modulated signal generated by the optical transmitter 10b illustrated in FIG. 8 is in the range of ±B with respect to the carrier wave frequency $f_0$. FIG. 9 illustrates an example of a case in which the carrier wave is set at a frequency position higher than or equal to $f_0+B$, and FIG. 10 illustrates an example of a case in which the carrier wave is set at a frequency position lower than or equal to $f_0-B$. FIG. 11 illustrates an example of a case in which the carrier wave is set at a frequency position lower than or equal to $f_0$, and FIG. 10 illustrates an example of a case in which the carrier wave is set at a frequency position higher than or equal to $f_0$.

In FIGS. 9 to 12, the left diagrams show the positions of the frequencies of the subcarrier multiplexed signal received by the optical receiver 30, and the right diagrams are for explaining concrete processes by the optical receiver 30.

The right diagram of FIG. 9 illustrates an example in which the upper side band components (+) of the subcarrier multiplexed signal converted into signals in an intermediate frequency band by optical heterodyne detection are extracted by an LPF, and the carrier components are removed by the LPF.

The right diagram of FIG. 10 illustrates an example in which the lower side band components (−) of the subcarrier multiplexed signal converted into signals in an intermediate frequency band by optical heterodyne detection are extracted by an LPF, and the carrier components are removed by the LPF.

The right diagram of FIG. 11 illustrates an example in which the upper side band components (+) of the subcarrier multiplexed signal converted into signals in an intermediate frequency band by optical heterodyne detection are extracted by an HPF, and the carrier components are removed by the HPF.

Figure 12:
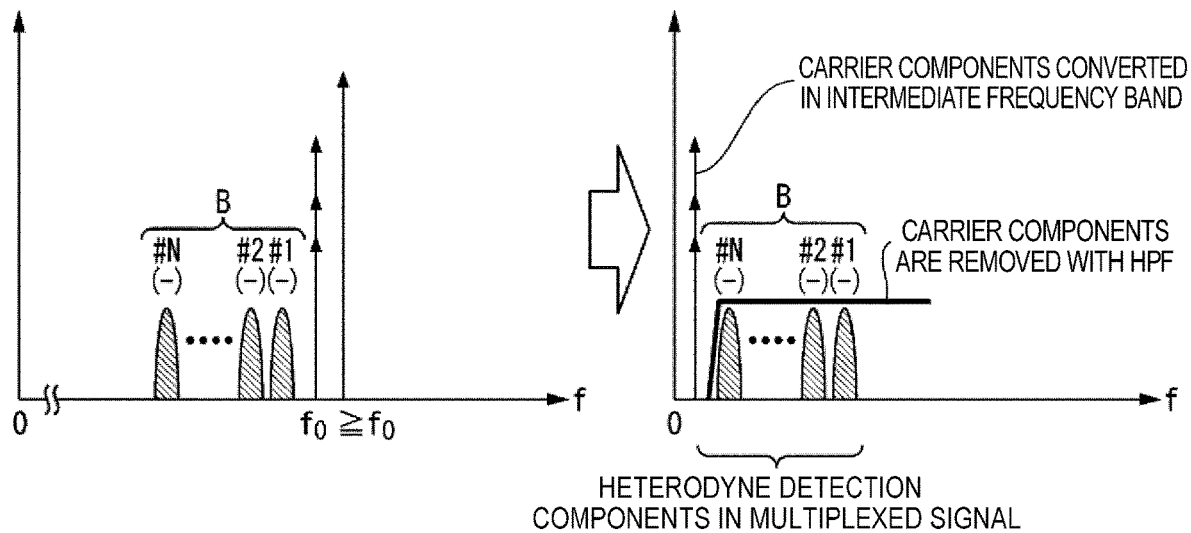
FIG. 12 is a diagram illustrating an example of a case in which the carrier wave is set at a frequency position higher than or equal to $f_0$ in the third embodiment.

The right diagram of FIG. 12 illustrates an example in which the lower side band components (−) of the subcarrier multiplexed signal converted into signals in an intermediate frequency band by optical heterodyne detection are extracted by an HPF, and the carrier components are removed by the HPF.

Although in FIGS. 11 and 12, the frequency of the carrier wave is lower than or equal to $f_0$ or higher than or equal to $f_0$, it may be set to near $f_0$.

Although in the optical transmission system 1 in the third embodiment, configured as described above, the frequency arrangement is the same as or similar to that in the optical intradyne detection, it is possible to receive signals using an optical heterodyne detector which is inexpensive. Thus, also in SSB, it is possible to perform, at low cost, deterioration of signal quality caused due to interference noise when optical reception is performed by coherent detection.

Modification Example

Although FIG. 8 illustrates an example in which the optical transmitter 10b generates a modulated signal including only upper side band (+) components, the optical transmitter 10b, in a possible configuration, may generate a modulated signal including only lower side band (−) components. In the case of such a configuration, the frequency shifters 18-1 to 18-n receive input of values zero, and the frequency shifters 18-n+1 to 18-2n receive input of the data signals mapped by the symbol mappers 11-1 to 11-n. The frequency shifters 18-n+1 to 18-2n shift the data signals mapped by the symbol mappers 11-1 to 11-n such that data signals do not overlap on the frequency axis.

Fourth Embodiment

Figure 16:
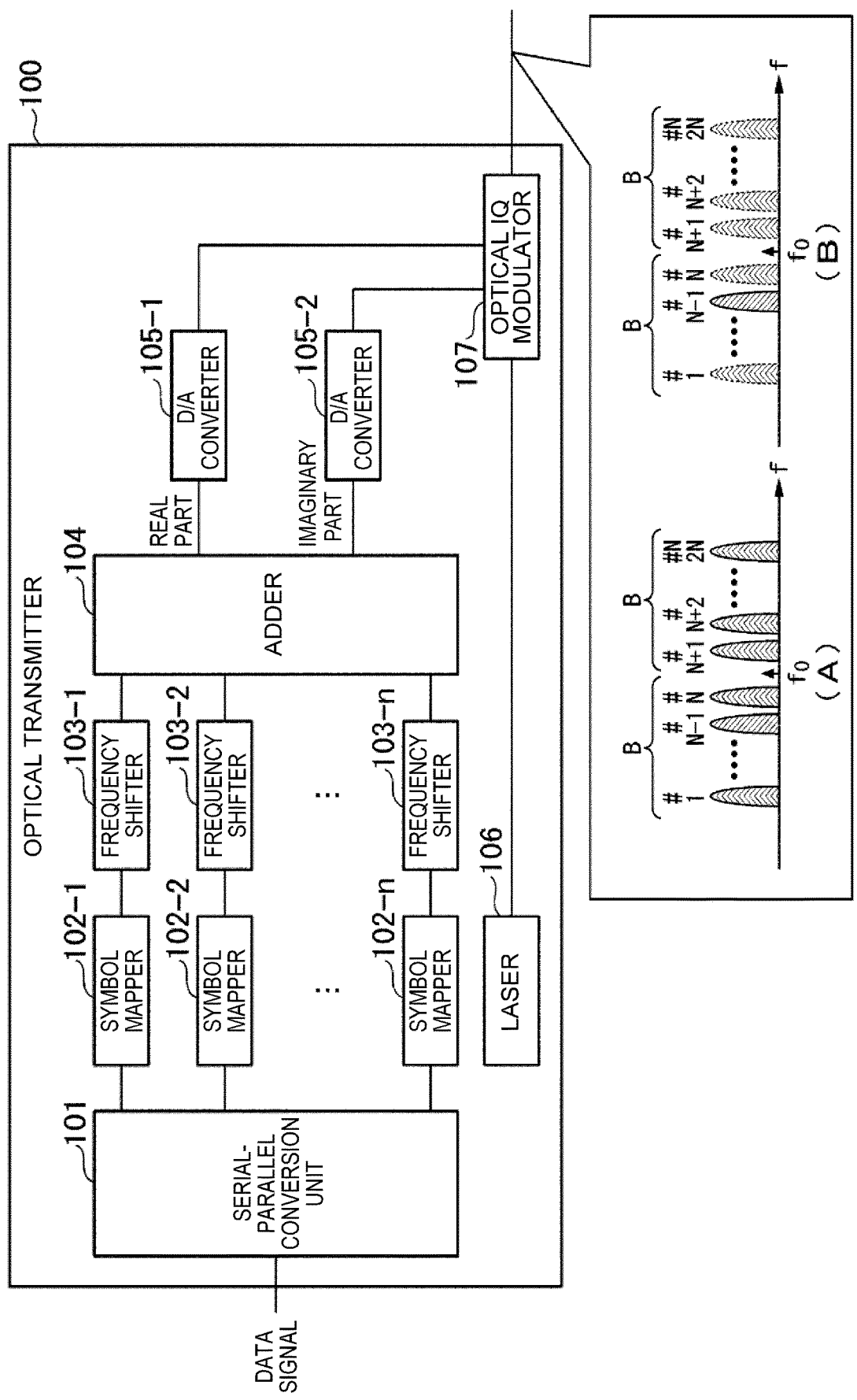
FIG. 16 is a block diagram illustrating the functional configuration of a conventional optical transmitter.
Figure 17:
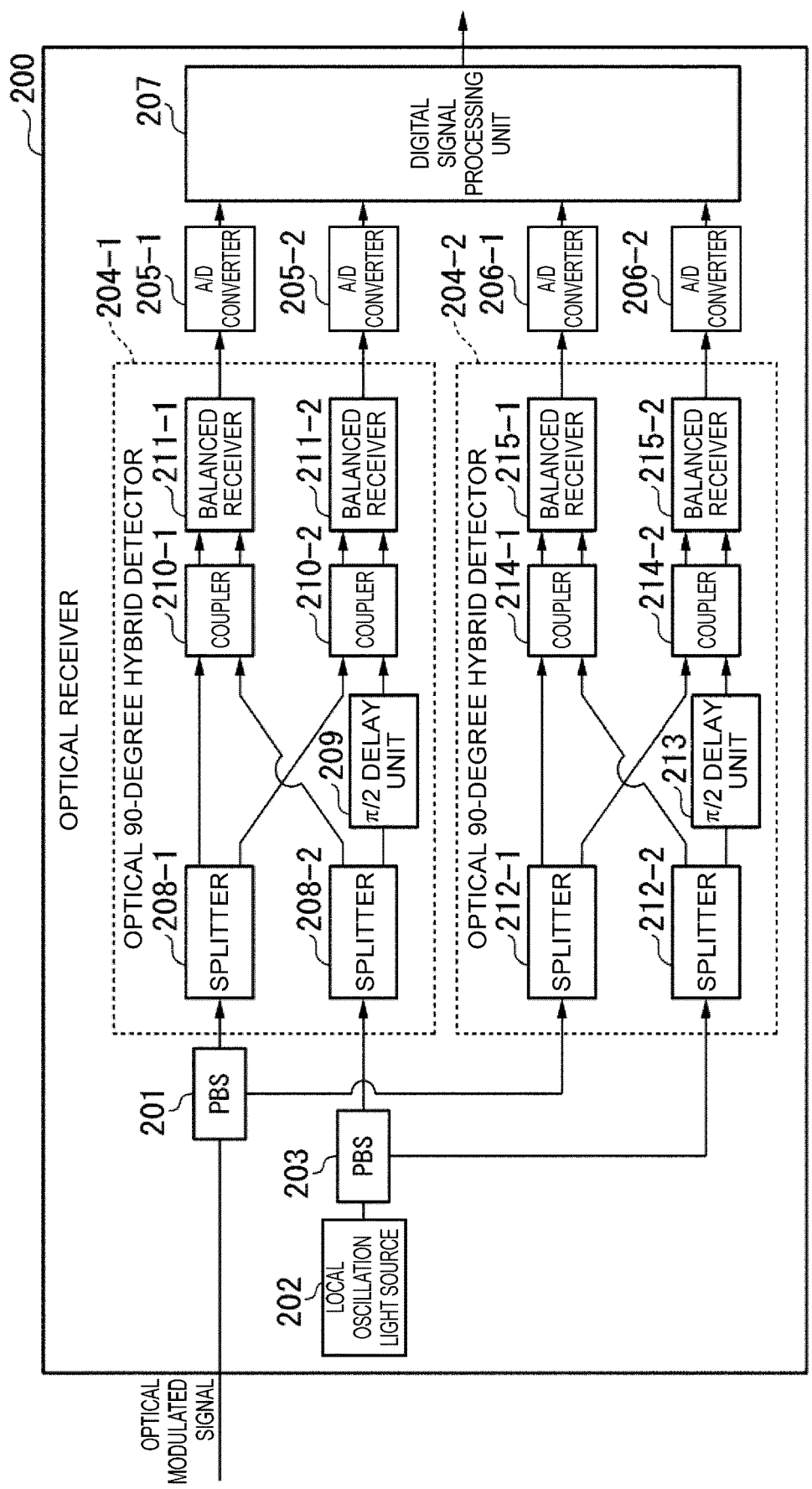
FIG. 17 is a block diagram illustrating the functional configuration of a conventional optical receiver.

In a fourth embodiment, a description will be given of a configuration for the case in which conventional optical transmitters are used. The configuration of an optical transmitter in the fourth embodiment is the same as or similar to that of the optical transmitter 100 illustrated in FIG. 16, and hence description thereof is omitted. The optical transmission system 1 in the fourth embodiment includes N ONUs 2-1 to 2-N each including the optical transmitter 100 and one OLT 3 including an optical receiver 30a. The ONUs 2-1 to 2-N and the OLT 3 are connected with optical fiber via an optical splitter 4.

The optical receiver 30a in the fourth embodiment is different from the ones in the first embodiment to the third embodiment in that the optical receiver 30a receives a multiplexed signal generated by the optical splitter 4 multiplexing modulated signals each generated by the optical IQ modulator 107 included in the optical transmitter 100. The configuration of the optical receiver 30a will be described below.

Figure 13:
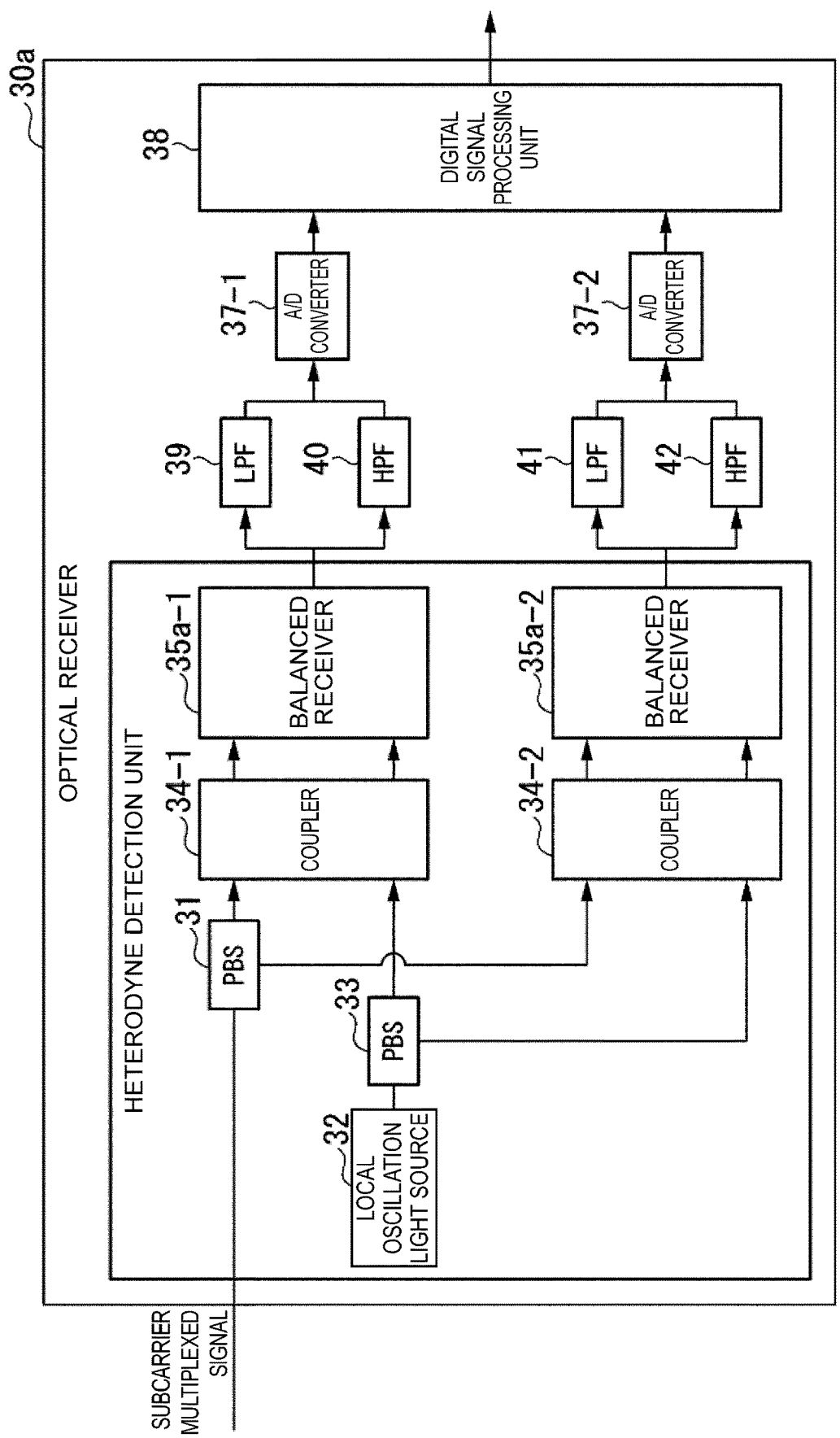
FIG. 13 is a block diagram illustrating the functional configuration of an optical receiver in a fourth embodiment.

FIG. 13 is a block diagram illustrating the functional configuration of the optical receiver 30a in the fourth embodiment. The optical receiver 30a is a digital coherent receiver that performs optical heterodyne detection. The optical receiver 30a includes a PBS 31, a local oscillation light source 32, a PBS 33, couplers 34-1 and 34-2, balanced receivers 35a-1 and 35a-2, A/D converters 37-1 and 37-2, a digital signal processing unit 38, a LPF 39, a HPF 40, a LPF 41, and a HPF 42. The PBS 31, the local oscillation light source 32, the PBS 33, the couplers 34-1 and 34-2, and the balanced receivers 35a-1 and 35a-2 show an example of a heterodyne detection unit.

The optical receiver 30a has a configuration different from the optical receiver 30 in that the optical receiver 30a includes the balanced receivers 35a-1 and 35a-2 in place of the balanced receivers 35-1 and 35-2, and it includes the LPF 39, the HPF 40, the LPF 41 and the HPF 42 in place of the filters 36-1 and 36-2. The other constituents in the optical receiver 30a are the same as or similar to those in the optical receiver 30, and hence, hereinafter, the balanced receivers 35a-1 and 35a-2, and the LPF 39, HPF 40, LPF 41 and HPF 42 will be described.

The balanced receiver 35a-1 converts two interference light signals outputted by the coupler 34-1 into electrical signals. The balanced receiver 35a-1 outputs the difference between the electrical signals generated by the conversion to the LPF 39 and the HPF 40.

The balanced receiver 35a-2 converts two interference light signals outputted by the coupler 34-2 into electrical signals. The balanced receiver 35a-2 outputs the difference between the electrical signals generated by the conversion to the LPF 41 and the HPF 42.

The LPF 39 performs filtering on the electrical signal corresponding to the difference between the two interference light signals outputted from the balanced receiver 35a-1. For example, the LPF 39 extracts only the upper side band components (+) of the subcarrier multiplexed (SCM) signal.

The HPF 40 performs filtering on the electrical signal corresponding to the difference between the two interference light signals outputted from the balanced receiver 35a-1. For example, the HPF 40 extracts only the lower side band components (−) of the subcarrier multiplexed (SCM) signal.

The LPF 41 performs filtering on the electrical signal corresponding to the difference between the two interference light signals outputted from the balanced receiver 35a-2. For example, the LPF 41 extracts only the upper side band components (+) of the subcarrier multiplexed (SCM) signal.

The HPF 42 performs filtering on the electrical signal corresponding to the difference between the two interference light signals outputted from the balanced receiver 35a-2. For example, the HPF 42 extracts only the lower side band components (−) from the subcarrier multiplexed (SCM) signal.

The A/D converter 37-1 performs analog-digital conversion on the upper side band components (+) extracted by the LPF 39 and the lower side band components (−) extracted by the HPF 40 to generate a digital signal.

The A/D converter 37-2 performs analog-digital conversion on the upper side band components (+) extracted by the LPF 41 and the lower side band components (−) extracted by the HPF 42 to generate a digital signal.

Figure 14:
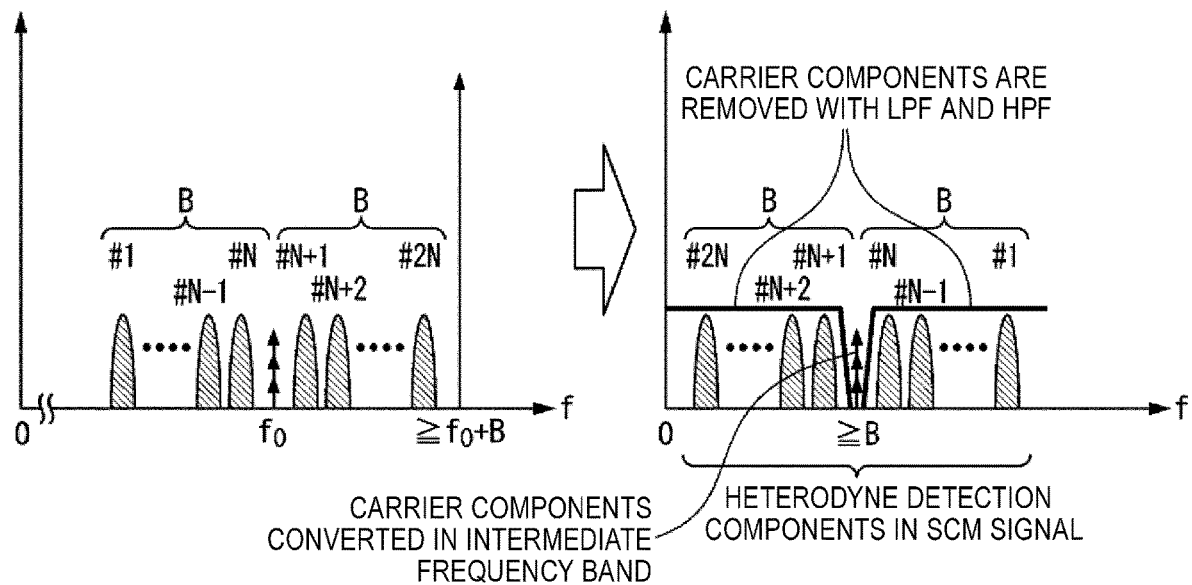
FIG. 14 is a diagram illustrating an example of a case in which the carrier wave is set at a frequency position higher than or equal to $f_0+B$ in the fourth embodiment.
Figure 15:
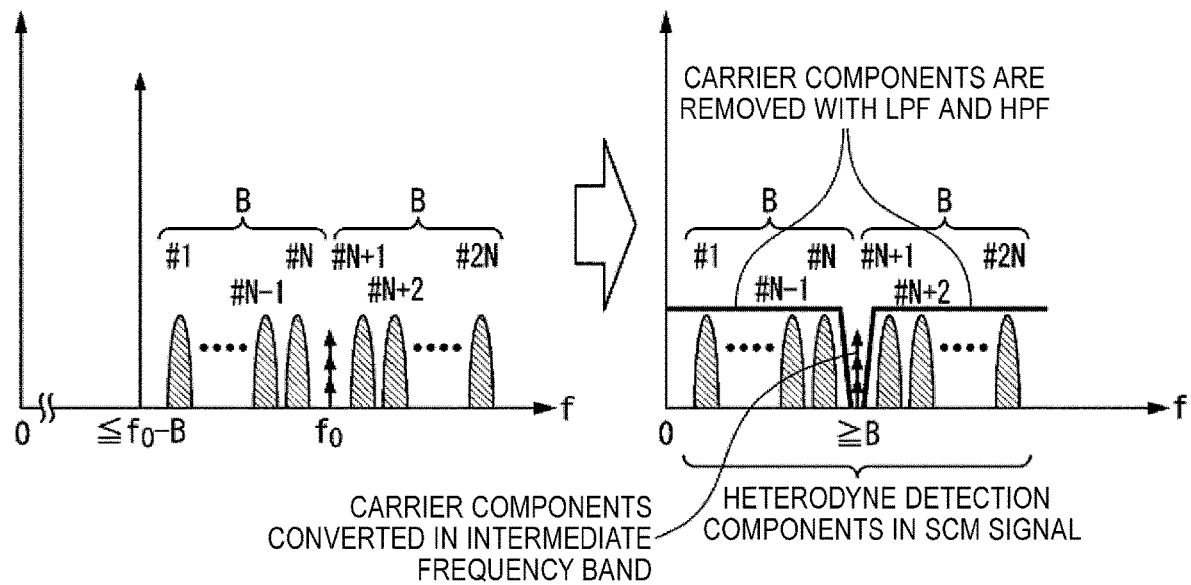
FIG. 15 is a diagram illustrating an example of a case in which the carrier wave is set at a frequency position lower than or equal to $f_0-B$ in the fourth embodiment.

FIG. 14 illustrates an example of a case in which the carrier wave is set at a frequency position higher than or equal to $f_0+B$, and FIG. 15 illustrates an example of a case in which the carrier wave is set at a frequency position lower than or equal to $f_0-B$. In FIGS. 14 and 15, the left diagrams show the positions of the frequencies of the subcarrier multiplexed signal received by the optical receiver 30a, and the right diagrams are for explaining concrete processes by the optical receiver 30a.

The right diagram of FIG. 14 illustrates an example in which the carrier components converted into signals in an intermediate frequency band by optical heterodyne detection are removed by the LPF 39 and the HPF 40. As described above, in the case in which the carrier wave is set to a frequency position higher than or equal to $f_0+B$, in other words, in the case in which the frequency position of the carrier wave is higher than or equal to a reference frequency, the optical receiver 30a extracts the upper side band components of the electrical signal with the LPF 39 and extracts the lower side band components of the electrical signal with the HPF 40.

The right diagram of FIG. 15 illustrates an example in which the carrier components converted into signals in an intermediate frequency band by optical heterodyne detection are removed by the LPF 41 and the HPF 42. As described above, in the case in which the carrier wave is set to a frequency position lower than or equal to $f_0-B$, in other words, in the case in which the frequency position of the carrier wave is lower than a reference frequency, the optical receiver 30a extracts the lower side band components of the electrical signal with the LPF 41 and extracts the upper side band components of the electrical signal with the HPF 42.

With the optical transmission system 1 in the fourth embodiment, configured as described above, even in the case of using conventional carrier-suppressed optical transmitters 100, the optical receiver 30a performs optical heterodyne detection on the subcarrier multiplexed signal based on the modulated signal transmitted from each optical transmitter 100 and removes the carrier components converted into an intermediate frequency band with a LPF and a HPF in the electrical step. Then, the optical receiver 30a extracts the subcarriers on which the transmission data is superimposed from the signal from which the carrier components have been removed, and demodulates the resultant signal. In addition, since the optical receiver 30a employs an optical heterodyne detector instead of an optical intradyne detector, it is possible to achieve cost reduction of the optical receiver. With this configuration, it is possible to significantly reduce signal quality deterioration caused due to interference noise when optical reception is performed by optical coherent detection. Thus, it is possible to perform, at low cost, deterioration of signal quality caused due to interference noise when optical reception is performed by coherent detection.

Modification Example

Although description of the example illustrated in FIG. 13 is based on a case in which the optical transmitter 100 transmits an optical signal having double side bands (DSB), the configuration may be such that the optical transmitter 100 transmits an optical signal having a single side band (SSB). In such a configuration, the optical receiver 30a operates as in the third embodiment. For example, the optical receiver 30a extracts single side band components from the optical signal transmitted by the optical transmitter 100 and removes the carrier components. Accordingly, the optical receiver 30a has one of the LPF 39 and the HPF 40 and one of the LPF 41 and the HPF 42.

With the configuration as above, it is possible also in SSB to perform, at low cost, deterioration of signal quality caused due to interference noise when optical reception is performed by coherent detection.

Although details of the embodiments of this invention have been described as above with reference to the drawings, concrete configurations are not limited to these embodiments, designs and the like within the scope not departing from the spirit of this invention are included in the invention.

INDUSTRIAL APPLICABILITY

The present invention is applicable to optical transmission techniques involving subcarrier multiplexing.

REFERENCE SIGNS LIST 2-1 to 2-N ONU
3 OLT
4 optical splitter
10, 10a, 10b, 10-1 to 10-N optical transmitter
20 D/A converter
30, 30a optical receiver
11, 11-1 to 11-n symbol mapper
12 oscillator
13 modulation circuit
14 laser
15 optical intensity modulator
16 serial-parallel converter
17 Hermitian symmetry unit
18-1 to 18-2n frequency shifter
19, 19b adder
20, 20-1, 20-2 D/A converter
21 optical intensity modulator
22 bi-electrode optical intensity modulator
31 PBS
32 local oscillation light source
33 PBS
34-1, 34-2 coupler
35-1, 35-2, 35a-1, 35a-2 balanced receiver
36-1, 36-2 filter
37-1, 37-2 A/D converter
38 digital signal processing unit
39 LPF
40 HPF
41 LPF
42 HPF

The invention claimed is:
1. An optical receiver comprising:
a heterodyne detector configured to convert, by heterodyne detection, a subcarrier multiplexed signal in which a plurality of optical signals transmitted from a plurality of optical transmitters are multiplexed, into an electrical signal in an intermediate frequency band;
a filter configured to remove a carrier component from the electrical signal in the intermediate frequency band, generated by the conversion, to extract a subcarrier component;
an analog-digital converter configured to perform analog-digital conversion on a signal having the subcarrier component extracted by the filter; and
a digital signal processor configured to perform digital signal processing for each subcarrier on a digital signal generated by the analog-digital conversion performed by the analog-digital converter.
2. The optical receiver according to claim 1, wherein
a range of the subcarrier component that the filter extracts is determined according to a frequency position of a carrier wave used by the plurality of optical transmitters.
3. The optical receiver according to claim 1, wherein
the plurality of optical transmitters are optical transmitters including an intensity modulator that performs intensity modulation, and
in a case in which a frequency position of a carrier wave used by the plurality of optical transmitters is higher than or equal to a reference frequency,
the filter is a low-pass filter and extracts an upper side band component of the electrical signal, or the filter is a high-pass filter and extracts a lower side band component of the electrical signal.
4. The optical receiver according to claim 1, wherein
the plurality of optical transmitters are optical transmitters including an intensity modulator that performs intensity modulation, and
in a case in which a frequency position of a carrier wave used by the plurality of optical transmitters is lower than a reference frequency,
the filter is a low-pass filter and extracts a lower side band component of the electrical signal, or the filter is a high-pass filter and extracts an upper side band component of the electrical signal.
5. The optical receiver according to claim 1, wherein
the plurality of optical transmitters are optical transmitters including an IQ modulator, and the filter includes at least a low-pass filter or a high-pass filter and extracts at least a single side band component of the electrical signal.

6. The optical receiver according to claim 5, wherein
in a case in which the filter includes both the low-pass filter and the high-pass filter, and a frequency position of a carrier wave used by the plurality of optical transmitters is higher than or equal to a reference frequency,
the low-pass filter extracts an upper side band component of the electrical signal, and
the high-pass filter extracts a lower side band component of the electrical signal.

7. The optical receiver according to claim 5, wherein
in a case in which the filter includes both the low-pass filter and the high-pass filter, and a frequency position of a carrier wave used by the plurality of optical transmitters is lower than a reference frequency,
the low-pass filter extracts a lower side band component of the electrical signal, and
the high-pass filter extracts the upper side band component of the electrical signal.

8. An optical reception method comprising:
converting, by heterodyne detection, a subcarrier multiplexed signal in which a plurality of optical signals transmitted from a plurality of optical transmitters are multiplexed, into an electrical signal in an intermediate frequency band;
removing a carrier component from the electrical signal in the intermediate frequency band, generated by the conversion, to extract a subcarrier component;
performing analog-digital conversion on an extracted signal having the subcarrier component; and
performing digital signal processing for each subcarrier on a digital signal generated by the analog-digital conversion.

\* \* \* \* \*